United States Patent [19]
Kurano

[11] Patent Number: 5,619,510
[45] Date of Patent: Apr. 8, 1997

[54] OUTPUT BUFFER TYPE ASYNCHRONOUS TRANSFER MODE SWITCH AND DETECTING ERROR BOARDS THEREOF

[75] Inventor: Takatoshi Kurano, Tokyo, Japan

[73] Assignee: NEC Corporation, Tokyo, Japan

[21] Appl. No.: 490,891

[22] Filed: Jun. 15, 1995

[30] Foreign Application Priority Data

Jun. 15, 1994 [JP] Japan .................................. 6-132768

[51] Int. Cl.$^6$ .............................. H04J 3/14; H04L 12/26
[52] U.S. Cl. ...................... 371/20.1; 371/20.2; 370/395; 370/417
[58] Field of Search ................................. 371/20.1, 22.1, 371/67.1; 370/17, 60, 61, 67.1, 59, 94.1, 58.1, 94.2

[56] References Cited

U.S. PATENT DOCUMENTS

| | | | |
|---|---|---|---|
| 5,299,209 | 3/1994 | Murayama et al. | 371/67.1 |
| 5,361,255 | 11/1994 | Diaz et al. | 370/58.1 |
| 5,365,519 | 11/1994 | Kozaki et al. | 370/60 |
| 5,394,395 | 2/1995 | Nagai et al. | 370/60 |
| 5,455,820 | 10/1995 | Yamada | 370/17 |
| 5,493,566 | 2/1996 | Ljungberg et al. | 370/60 |

*Primary Examiner*—Robert W. Beausoliel, Jr.
*Assistant Examiner*—Nadeem Iqbal
*Attorney, Agent, or Firm*—Young & Thompson

[57] ABSTRACT

A buffer control circuit is arranged for each of a master board and a slave board having FIFO buffers corresponding to each output port. Each of the buffer control circuits is arranged on the boards in a bit-slice structure. The buffer control circuit on the side of the master board transmits a synchronizing control signal to the corresponding buffer control circuit on the side of the slave boards. The buffer control circuit resets the corresponding FIFO buffer to synchronize the boards, when routing control signals indicate empty cell, or output ports to which the cells are not addressed and an empty FIFO buffer 14 exists. A monitoring trigger is periodically input to the buffer control circuit 21 at predetermined intervals, and the number of cells in the FIFO buffer on each of the boards are compared for each destinations at the time of inputting the monitoring trigger. Synchronizing each boards is carried out by resetting all of the FIFO buffers on the boards for the destination for which the number of the cells does not coincide. An output buffer type ATM switch of the present invention is capable of synchronizing-each of the boards consisting of the switch without a monitoring cell.

25 Claims, 7 Drawing Sheets

OUTPUT BUFFER TYPE ASYNCHRONOUS TRANSFER MODE SWITCH AND DETECTING ERROR BOARDS THEREOF

BACKGROUND OF THE INVENTION

1. Field of the Invention

The present invention relates to an asynchronous transfer mode (hereinafter referred to as an ATM) switch of an output buffer type used in asynchronous transfer mode communication systems. More particularly, the present invention relates to an asynchronous transfer mode switch of an output buffer type for performing asynchronous control among a plurality of switching boards. Also, the present invention relates to a method of detecting and correcting error-containing boards in an ATM switch.

2. Description of Related Art

Asynchronous transfer mode switches of an output buffer type used in an ATM communication system increase their processing speed in proportion to switch size. The ATM switches, in most cases, are separately equipped on a plurality of boards and each board mounts a buffer control circuit to control inputting and outputting of data. The ATM switch has a plurality of input ports and output ports and basically functions to switch data input from the input ports and send switched data to the output ports.

Conventional ATM switches have a master board and a plurality of slave boards. In each board, first to Mth first-in first-out buffers (hereinafter, referred to as FIFO buffers) are arranged corresponding to first to Mth output ports. A cell multiplex circuit is arranged in a pre-stage of these FIFO buffers so as to receive input from first to Nth input ports. In addition, in each board, a buffer control circuit for receiving routing control signals is arranged. The buffer control circuit controls the FIFO buffers corresponding to each of the boards.

In the conventional ATM switch, the parallel cell input to the cell multiplex circuit is time-division multiplexed by the cell multiplex circuit. These multiplexed cells are sequentially assigned to the first to the Mth FIFO buffers one by one to be supplied thereto. In this ATM switch, a bit-slice structure is usually used to reduce processing time. In such an ATM switch using the bit-slice structure, the first to the Mth FIFO buffers have bit-slice structure and are formed on a chip of a large scale integrated circuit (LSI) of bit number equal to the value obtained by dividing the bit length of each cell by the number of the boards.

In the conventional ATM switch, since the buffer control circuits of the boards are synchronized with each other, it has been required to detect the time at which any error occurs. Therefore, monitoring cells for monitoring the occurrence of errors from the outside of the boards are input to the ATM switch at regular intervals. Self-testing is executed by, for example the above monitoring cells method. When an error occurs, a reset signal is applied from the master board to the slave board to clear all contents of the FIFO buffers of the board in which the error occurs. Then, operations of the ATM switch are resumed to synchronize the boards with each other.

However, in the conventional ATM switch, a central processing unit CPU supplies the monitoring cells to each of the boards at a prescribed period. When disorders are detected, a re-synchronization process is executed to synchronize these boards. Therefore, a rather long period of time is required to detect disorders of the ATM switch and to cause opening thereof. In addition, when the disorder of the ATM switch is caused during operation, the resetting is carried out to synchronize the buffer control circuits. At that time, all of the boards are reset so that normal ports (highway ports) are reset. Hence, all data stored in the FIFO buffer is cleared. Further, the processing speed of the ATM switch becomes high in proportion to the scale of the ATM switch so that the synchronization control at the time of the re-synchronizing differs greatly.

SUMMARY OF THE INVENTION

A principal object of the present invention is to provide an ATM switch which can monitor and synchronize each board constituting a switch of a bit-slice structure without using particular cells.

Another object of the present invention is to provide an ATM switch in which useful data stored in an FIFO buffer is not cleared at the time of a re-synchronization.

The output buffer type ATM switch of the present invention primarily has a master board and one or a plurality of slave boards, and a buffer control circuit to control assignment of an address of cells arranged for each of the boards. The output buffer type ATM switch also includes a buffer control circuit which is arranged in each of these boards and has a bit-slice structure. This circuit functions such that time-divisionally multiplexed cells are input from N input ports supply each FIFO buffer circuit corresponding to each of M output ports. The cells are sequentially written to the FIFO buffers based on information concerning addresses outputted from output ports by each of the buffer control circuits.

The buffer control circuit in the master board particularly has a timing detecting circuit to detect timing when the cells input to all of the input ports are empty. Also, this circuit has a reset circuit to reset corresponding empty FIFO buffers at the timing of detecting the empty cells when contents of any one of the FIFO buffers corresponding to the output ports are empty, so as to synchronize among all of the boards.

In the above ATM switch, the empty FIFO buffers are reset when the cells input to all of the input ports are empty. Therefore, all of the boards are synchronized without clearing effective cell information.

In the above ATM switch, it is possible to cause the buffer control circuit of the master board to detect output ports to which none of the input cells are addressed, instead of detecting occurrence of an empty state for input cells. This circuit resets corresponding empty FIFO buffers upon detecting the empty cells when contents of any one of the FIFO buffers corresponding to the output ports are empty, so as to synchronize among all of the boards.

A characteristic feature of the invention is to detect output ports to which none of the input cells are addressed, thereby to determine that FIFO buffers corresponding to such output ports are empty. Upon detecting such output ports, the empty FIFO buffers are reset so that all of the boards are synchronized without clearing active cell information.

Moreover, routing control signals can be used to indicate whether each cell is empty in the ATM switch of the present invention. These signals are input to the buffer control circuit to synchronize with input timing of each of the cells and to discriminate the state of each cell. The buffer control circuits further include cell judging circuits to judge whether the cell corresponding to every N input ports is empty on the basis of the above routing control signals. The buffer control circuits also include reset timing circuits to set a timing to reset by performing logical-product determinations concerning the above results using N input ports. The discriminating information to indicate the cell state may be added to e.g., a header portion of the routing control signals so that the empty cell can be easily discriminated in the buffer control circuit.

In the output buffer type ATM switch of the present invention, each of the ATM switches can be equipped with an auxiliary system having an auxiliary master board and slave boards. When reset is required from the reset timing circuit, a currently-used system can be successfully converted into the auxiliary system immediately. Non-momentary break switching to convert the currently-used and auxiliary systems simultaneously is given by the ATM switch of the present invention.

In addition, the ATM switch of the present invention can use a time measuring circuit to measure a lapse of time from a reset operation by a reset timing circuit to synchronize among all of the boards to the next reset operation. In this structure of the ATM switch, monitoring cells are supplied by a monitoring cell supply circuit to the boards when a measured value by the lapse of time measuring circuit exceeds a predetermined threshold value. Also, a diagnosing circuit is provided in the ATM switch to diagnose, by using the monitoring cells, whether troubles in asynchronous transmitting are caused or not. When the diagnosing circuit detects an occurrence of troubles, a forced-reset operation circuit resets the synchronization in each of the boards and re-synchronizes each of the boards.

By adopting these circuits, when empty cells occur, the monitoring cells can check a presence of troubles for a period time as in the conventional ATM switch, and each of the boards is forced to re-synchronize when troubles are caused. As a result, when an asynchronous state of the boards appears, the above situation can be automatically restored.

Another approach can be adopted to solve the problems in the conventional ATM switch. It is possible to check situations in each of the boards by periodically inputting trigger signals into the output buffer circuit of the present invention.

In this structure, the output buffer type of the ATM switch further includes a trigger signal generating circuit to periodically generate the trigger signals at a predetermined interval. This interval might be longer than a length of the cell. At the time of inputting the trigger signals, the buffer control circuits of each of the boards detects the number of stored cells in output FIFO buffer memories on the boards. Then, each of the buffer control circuits sends the detected numbers to the buffer control circuit of the master boards.

The buffer control circuit of the master board has a comparison circuit to compare the numbers from the boards. It is easily possible to confirm a normal situation when the comparison circuitry detects coincidence of the numbers of all of FIFO buffers. In this case, the operation of the ATM switch is continued. On the contrary, when the number of stored cells in any of the at least one FIFO buffer memory does not coincide with the others, it is judged that an abnormal situation has occurred. Then, the FIFO buffer memory having the non-coincident number of stored cells is reset by reset signal from the trigger signal generating circuit at the time of synchronizing with the next trigger signal. The reset signal is sent to the abnormal FIFO buffer memory through the buffer control circuit of the master board.

The above ATM switch of the present invention can successfully avoid continuing the abnormal situation for more than a predetermined period in response to an interval of the trigger signals.

BRIEF DESCRIPTION OF THE DRAWINGS

The above and other objects, features and advantages of the present invention will become more apparent from the following detailed description taken with reference to the accompanying drawings wherein.

DETAILED DESCRIPTION OF THE PREFERRED EMBODIMENTS

To begin with, to more easily understand the present invention, a conventional output buffer type ATM switch will be described referring to FIG. 1.

The conventional ATM switch is constituted of master board 11 and a plurality of slave boards 12. Note that only one slave board 12 is depicted for ease of explanation in FIG. 1. In each of boards 11 and 12, first to Mth first-in first-out buffers $14_1$ and $14_M$ are arranged corresponding to first to Mth output ports $13_1$ to $13_M$. A cell multiplex circuit 15 is arranged as a pre-stage of these FIFO buffers $14_1$ to $14_M$ so as to receive input of cells from first to Nth input ports $16_1$ to $16_N$. In addition, in each of the boards 11 and 12, an output buffer control circuit 19 receiving routing control signals $18_1$ and $18_N$ is arranged. The output buffer control circuit 19 controls the FIFO buffers $14_1$ to $14_M$ corresponding to each of the boards 11 and 12.

In the conventional ATM switch having the above structure, the parallel cell input to the cell multiplex circuit 15 is time-division multiplexed by the cell multiplex circuit 15. These multiplexed cells are sequentially assigned to the first to the Mth FIFO buffers $14_1$ to $14_M$ one by one for input thereto. The first to the Mth FIFO buffers have a bit-slice structure. These FIFO buffers are formed on a chip of a large scale integrated circuit (LSI) of bit number equal to the value obtained by dividing the bit length of each cell by the number of the boards 11 and 12.

The buffer control circuit 19 assigns addresses of the cells outputted from the first to the Mth FIFO buffers $14_1$ to $14_M$ arranged corresponding to the first to the Mth output ports $13_1$ to $13_M$ according to their destinations using the routing control signals $18_1$ to $18_N$. In addition, each of the boards 11 and 12 are synchronized with each other at the time of their data reception and upon occurrence of any disorder. This is because bits forming each cell divided into the master and slave boards 11 and 12 are processed in parallel. Therefore, synchronization is required between the buffer control circuit 19 of the master board 11 (hereinafter referred to as the buffer control circuit 19M) and the buffer control circuit 19 of the slave board 12 (hereinafter referred to as the buffer control circuit 19S).

In the conventional ATM switch, to synchronize between the buffer control circuits 19M and 19S of the boards 11 and 12, it is necessary to detect the time at which a disorder occurs. Monitoring cells are input to the ATM switch from outside-of the boards 11 and 12 at regular intervals to monitor the state of each of the boards 11 and 12. Disorder is detected by monitoring cells output from the switch. When a disorder is detected by the detecting circuit, a reset signal is supplied from the detecting circuit to that the master board 11 and the slave board 12 at which a disorder is detected, to clear all data of the FIFO buffers $14_1$ to $14_M$ of the boards 11 and 12. Then, operations of the ATM switch are resumed to synchronize the boards 11 and 12 with each other.

In the conventional ATM switch, however, a central processing unit CPU (not shown) supplies the monitoring cells to each of the boards 11 and 12 at a prescribed period. When disorders are detected, a re-synchronization process is executed to synchronize these boards 11 and 12. Therefore, there has been a problem that a long period of time is required to re-synchronize the boards following the detection of disorders until the reopening thereof.

In addition, when a disorder of the ATM switch is caused during operation, reseting is carried out to synchronize the buffer control circuits 19M and 19S. At that time, it is necessary that all of the boards 11 and 12 are reset in order to reset normal ports (highway ports). Hence, all data stored in each FIFO buffer 14 should be cleared. Further, the processing speed of the ATM switch becomes high in proportion to the scale of the ATM switch because the synchronization control at the time of the re-synchronizing becomes difficult.

Figure 2:
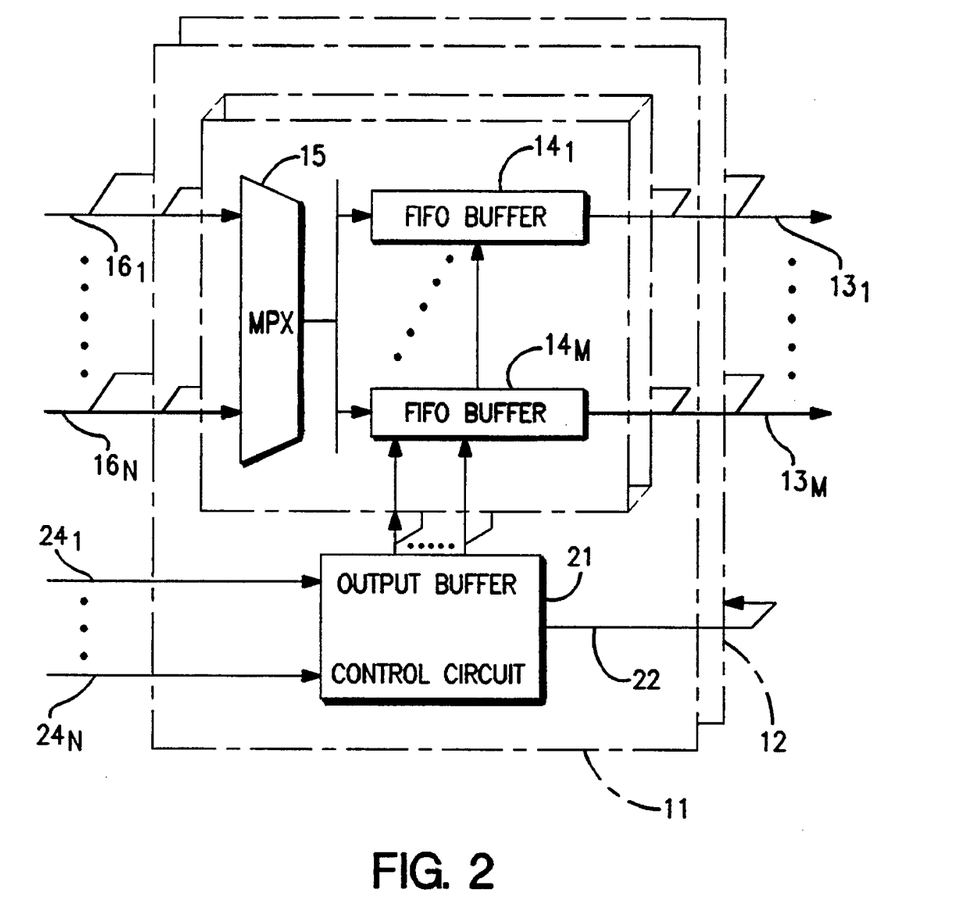
FIG. 2 is a circuit diagram showing an ATM switch of an output buffer type according to a first embodiment of the present invention.

A first embodiment of the present invention will now be described in detail. FIG. 2 is a circuit diagram showing an ATM switch of an output buffer type of the first embodiment.

Figure 1:
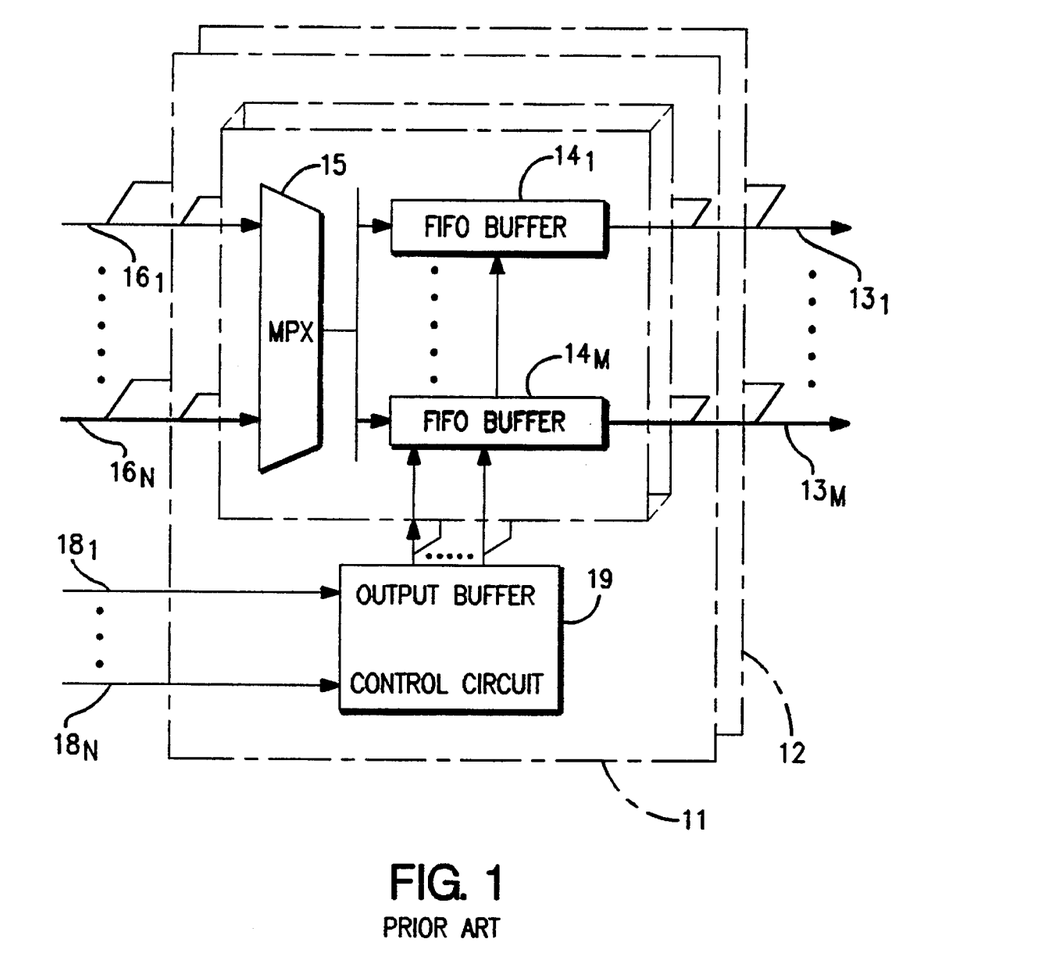
FIG. 1 is a circuit diagram showing a conventional ATM switch of an output buffer type.

The same reference numerals are given to the same portions in FIG. 2 as those in FIG. 1. Also, explanations as to the same portions in FIG. 2 as those in FIG. 1 will be suitably omitted. The ATM switch of this embodiment includes a master board 11 and one or a plurality of slave boards 12. Also, in this embodiment, the explanation will be given for the case where the ATM switch has just one slave board 12.

In this embodiment, a buffer control circuit 21 is arranged for each of the master board 11 and the slave board 12, respectively. The buffer control circuit 21 (hereinafter referred to as a buffer control circuit 21M) of the master board 11 transmits a synchronization control signal 22 to a buffer control circuit 21 (hereinafter referred to as a buffer control circuit 21S) of slave board 12 so as to synchronize the boards 11 and 12 with each other. The reason for synchronizing the boards 11 and 12 is to maintain the number of cells stored in first to Mth FIFO buffers $14_1$ to $14_M$ equal between the master board 11 and the slave board 12 by resetting both simultaneously. These boards 11 and 12 are so designed that they are supplied with routing signals $24_1$ to $24_M$ synchronized with the cells.

Figure 3:
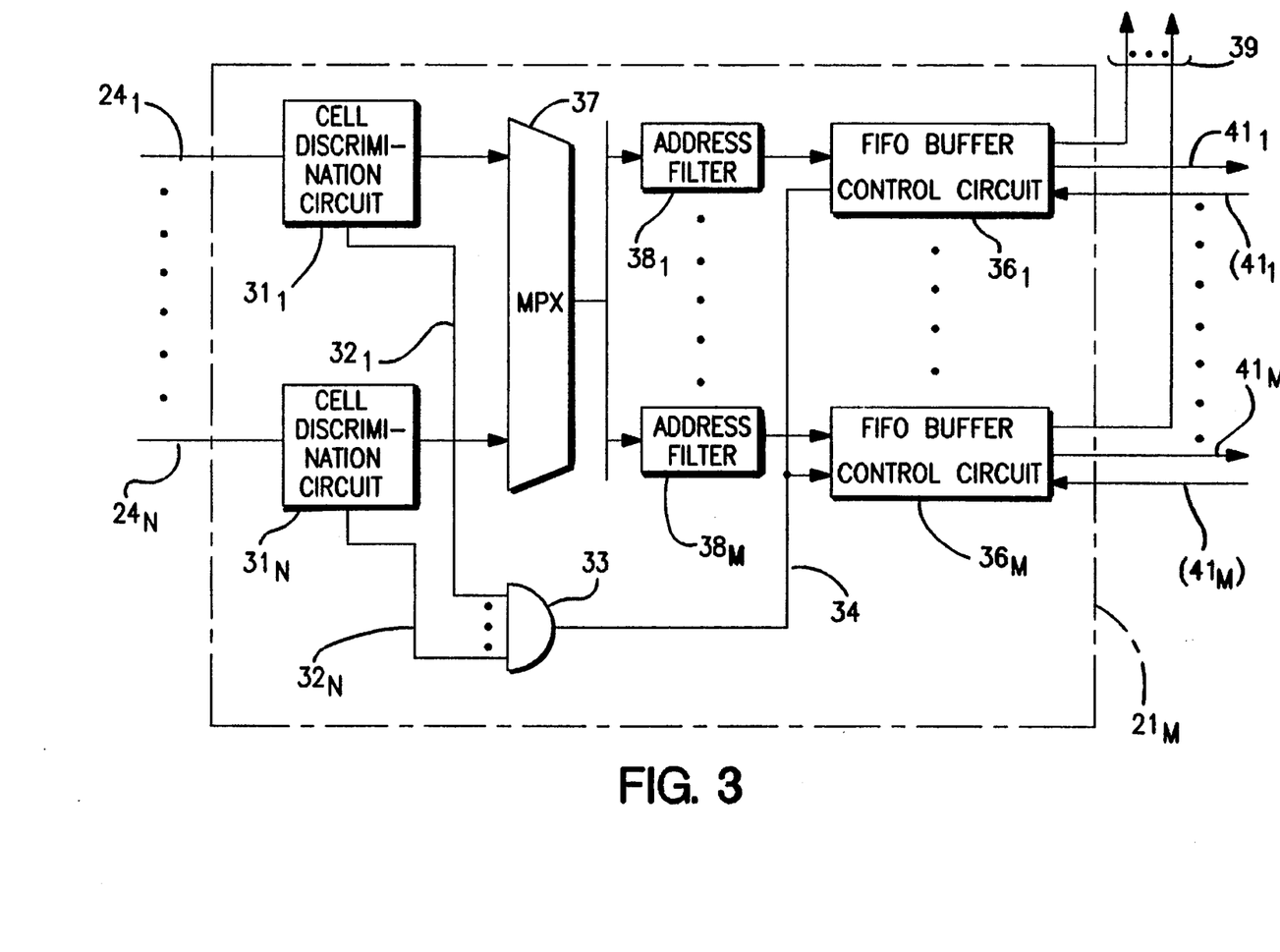
FIG. 3 is a circuit diagram showing a buffer circuit used in the first embodiment of the present invention.

FIG. 3 is a circuit diagram showing the details of the buffer control circuit 21M of the master board 11. Indicators for indicating whether cells are in an active state or an empty state are written to the routing control signals $24_1$ to $24_M$ for each cell. These routing control signals $24_1$ to $24_M$ are input to respective cell discrimination circuits $31_1$ to $31_N$. Empty cell judging signals $32_1$ to $32_N$ are extracted, which are at a level "1" when the cells are in the empty state and are at a level "0" when the cells are in the active state. These empty cell judging signals $32_1$ to $32_N$ are input to an N input AND gate 33 to perform a logical AND operation. An empty cell signal 34 indicating when empty signals are input to all input ports is output from the N input AND gate 33. Each of these empty cell signals 34 is input to the series of FIFO buffer control circuits $36_1$ to $36_M$, each of which corresponds to a respective one of the first to Mth FIFO buffers $14_1$ to $14_M$ shown in FIG. 2.

On the other hand, the routing control signals $24_1$ to $24_N$ passing through the cell discrimination circuits $31_1$ to $31_N$ are time-divisionally multiplexed by a multiplexing circuit 37. The cells address corresponding to the first to Mth FIFO buffer control circuits $36_1$ to $36_M$, which are extracted by the first to Mth address filters $38_1$ to $38_M$, are input to the circuits $36_1$ to $36_M$. The first to Mth FIFO buffer control circuits $36_1$ to $36_M$ transmit FIFO buffer control signals 39 to the corresponding FIFO buffers $14_1$ to $14_M$ to cause the FIFO buffers to fetch the cells, when the cell is addressed to corresponding output ports $13_1$ to $13_M$ controlled by the circuits $36_1$ to $36_M$.

It will be noted that the first to Mth FIFO buffer control circuits $36_1$ to $36_M$ control the storage number of each cell corresponding to one of the first to Mth FIFO buffers $14_1$ to $14_M$ shown in FIG. 2. When all cells of any one of the first to Mth FIFO buffers $14_1$ to $14_M$ become empty, a reset signal 41 is output to the FIFO buffer control circuit 36 corresponding to any one port of the first to Mth output ports $13_1$ to $13_M$ at the timing of an empty cell signal showing an empty cell. For example, if the output port $13_1$ corresponds to the FIFO buffer having the empty cell, a first reset signal $41_1$ is output from the first FIFO buffer control circuit $36_1$ of the buffer control circuit 21M and input to the first FIFO buffer control circuit 21S.

Thus, in this embodiment, the first FIFO buffers $14_1$ of both boards 11 and 12 are reset simultaneously so that the cells begin to be stored only after synchronization of both of the first FIFO buffers $14_1$. Since the first FIFO buffers $14_1$ become empty at the resetting time, active cells need not be distinguished to prevent data loss. Note that, when a plurality of slave boards 12 are employed, corresponding FIFO buffers 14 for the output ports of all slave boards 12 are reset simultaneously with that of the master board 11.

Figure 4:
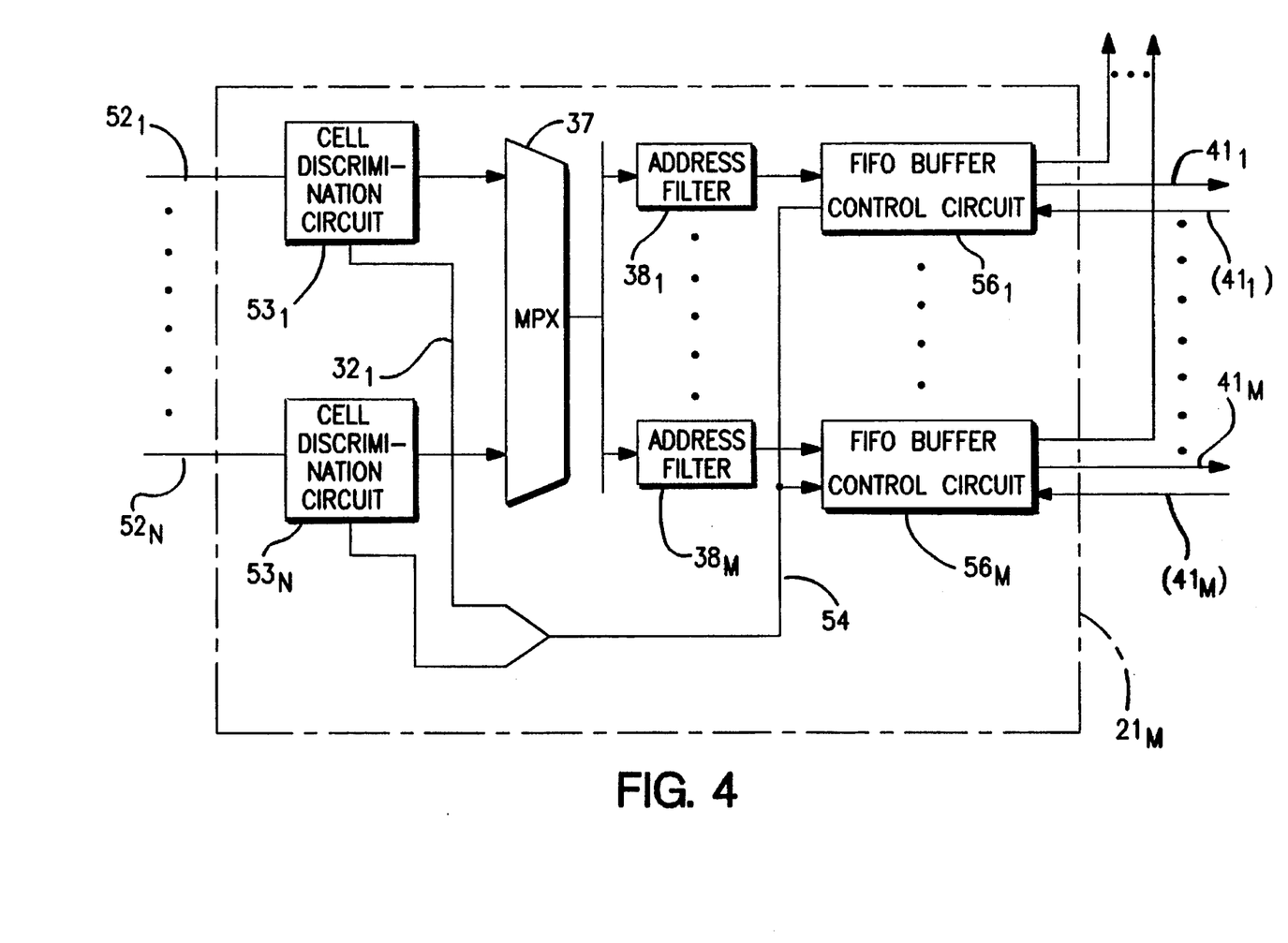
FIG. 4 is a circuit diagram showing another example of a buffer circuit that may be used in the first embodiment of the present invention.

Next, another buffer control circuit of the present invention will be described referring to FIG. 4. FIG. 4 is a circuit diagram showing another buffer control circuit of the ATM switch. The same reference numerals are affixed to the same portions as those of FIG. 3, and explanations of those portions will be omitted. Routing control signals $52_1$ to $52_M$ input to a buffer control circuit 51 in this embodiment are input to corresponding address judging circuits $53_1$ to $53_M$, respectively. However, the routing control signals $52_1$ to $52_M$ are not assigned to output ports lacking the cell's address. Specifically, in the FIG. 3 example, flags or the like are used to indicate whether the cells are empty. Contrarily, in this example, the output ports to which none of the cells are addressed, are detected by investigating addresses of the cells.

An output port detecting signal 54 is output from the address judging circuits $53_1$ to $53_N$ and input to the first to Mth FIFO buffer control circuits $56_1$ to $56_M$. The first to Mth FIFO buffer control circuits $56_1$ to $56_M$ judge whether the cells are stored corresponding to the first to Mth FIFO buffer control circuits $56_1$ to $56_M$. When all of the cells are empty, the FIFO buffer 14 to whose port none of the cells are addressed is reset by a reset signal when that port is designated. This reset is effected by output port detecting signal 54, as an output port to which the cell is not addressed.

In both examples of the buffer circuit, descriptions of the duplex output buffer ATM switch are omitted for the sake of brevity. To secure reliability of the ATM switch, when the output buffer ATM switches are duplexed in "0" system and "1" system, the output buffer ATM switch is operated at reset timing so as to be switched from one system to the other system, thereby easily realizing a non-momentary break switching.

In both of the above examples, when the empty cell satisfies a prescribed condition, the boards are synchronized with each other. However, when such condition does not appear for a long period of time, monitoring cells are input at predetermined intervals until the condition is detected. Therefore, the boards may be synchronized by a reset signal when a disorder occurs.

As described above, the FIFO buffer in which the cell are not stored can be reset when the cells input to all of the input ports are empty. All of the boards are synchronized with each other without the need for clearing active cell information by the reset. Further, unlike the conventional output buffer ATM switch in which the boards are not synchronized with each other until a disorder occurs, the output buffer ATM switch of the present invention can avoid occurrences of disorders beforehand in many cases, thereby enhancing reliability of the ATM switch.

Also, since it is sufficient to monitor the cell reaching the input port and to monitor the FIFO buffer, the ATM switch of the present invention has an advantage that a synchronizing signal does not depend on the switching size, i.e., it is decided by input/output port speed.

Figure 5:
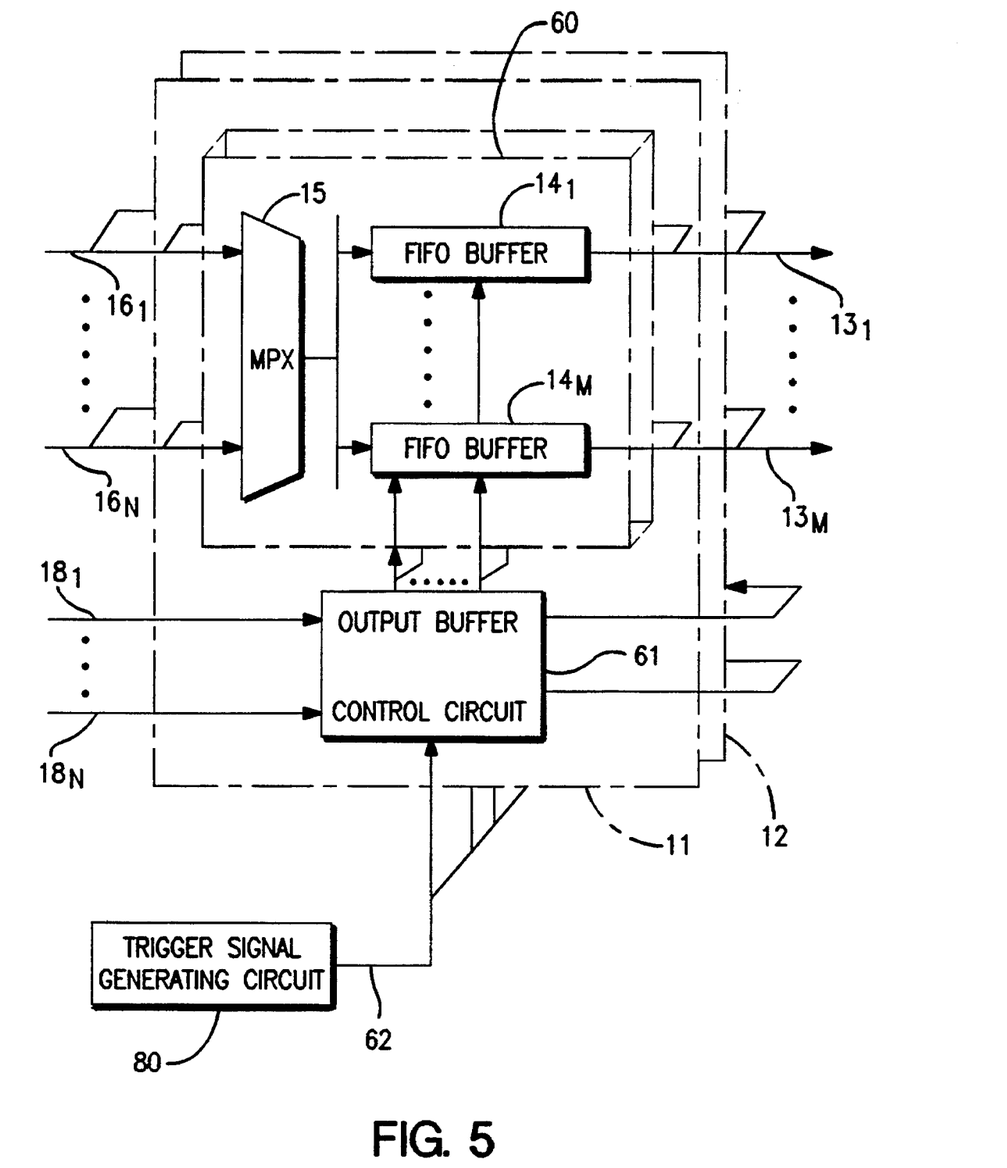
FIG. 5 is a circuit diagram showing an ATM switch according to a second embodiment of the present invention.

Next, a second embodiment will be described referring to FIGS. 5, 6 and 7. As shown in FIG. 5, the main characteristic of the third embodiment is that a trigger generating circuit 80 is further provided to the master board 11 and slave board 12. This circuit generates trigger signals at a predetermined intervals and periodically sends them to the buffer control circuit 19 of the master board 11 and slave board 12. Now, to more easily understand this embodiment, it is supposed that cells input to the ATM switch are synchronized with each other at all of the input ports and output ports. Also, it is supposed that these cells transmitting speed are the same.

Figure 6:
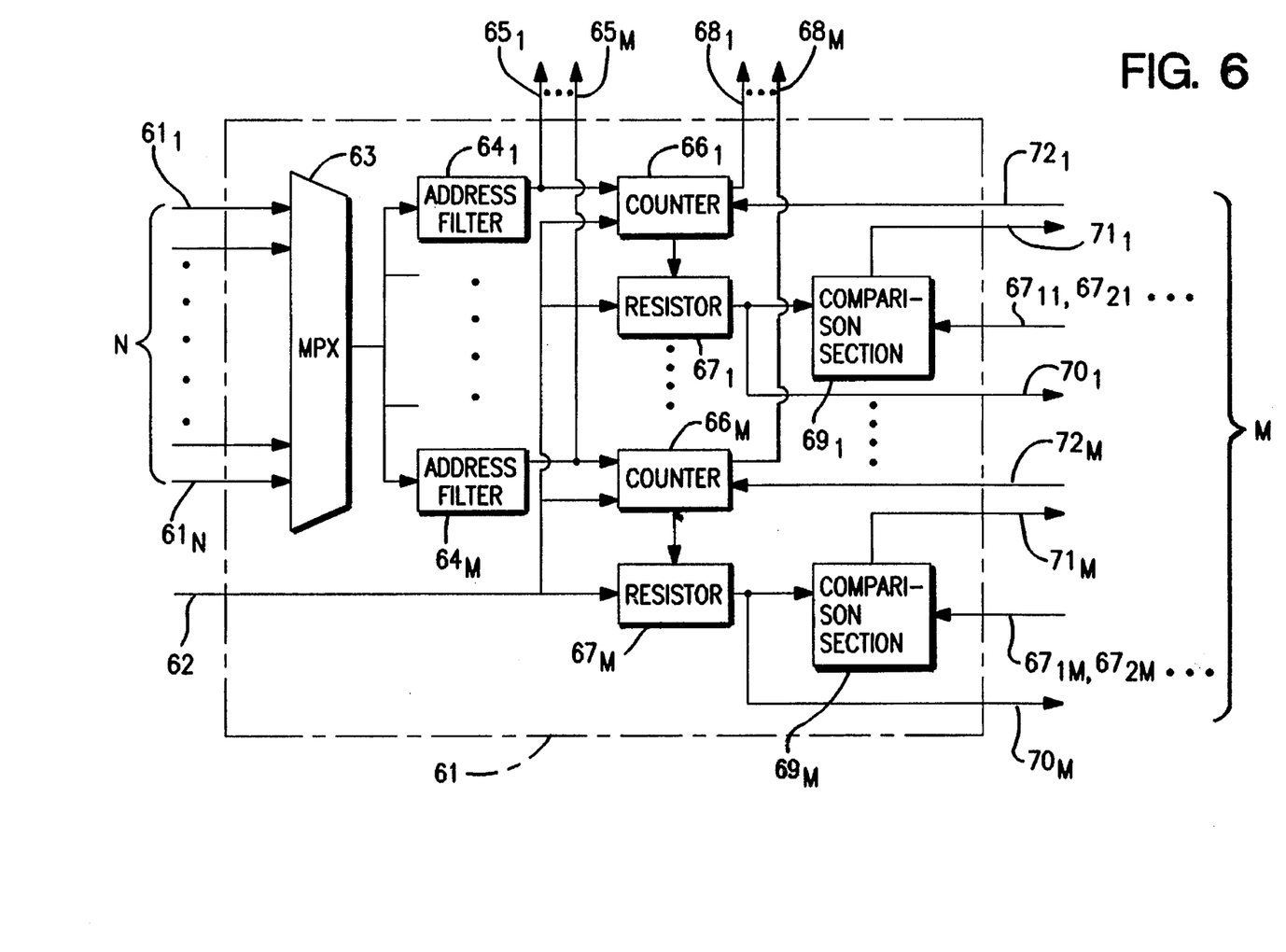
FIG. 6 is a circuit diagram showing a buffer circuit used in the second embodiment of the present invention.

In FIG. 6, input signal $61_1$—$61_N$ indicating each of their destinations, are multiplexed at a multiplexing section 63. This multiplexing section is connected to the output ports. Address filters $64_1$—$64_M$ are located at each of the output ports of the multiplexing section 63. The address filters $64_1$—$64_M$ function to judge whether the destination of signals $61_1$—$64_N$ coincides with its output port. When a coincidence is given, buffer writing signal $65_1$—$65_M$ are outputted from the address $64_1$—$64_M$, respectively. Then, each of the counters $66_1$14 $66_M$ counts the number of stored cells in FIFO buffer memories $56_1$—$56_M$ plus one, respectively. When the counted value is greater than zero, buffer reading control signal $68_1$—$68_M$ are output in response to output cells timing. At the same time, the counters $66_1$—$66_M$ are counted down minus one, respectively.

In the above configuration, buffer control circuit 61 are sent the trigger signal 62 from the trigger generating circuit 80 at a predetermined interval. Each of counted values in the counters $66_1$—$66_M$ to indicating the number of the cells currently stored in each of FIFO buffer memories $64_1$—$64_M$ (not shown) are latched at the time of receiving the trigger signal 62. At the same time, the above counted value are sent to the other boards 12 as counted values $70_1$—$70_M$. Comparison circuits $69_1$—$69_M$ compare counted values $67_{1f}$—$67_{1m}$, sent from other board 12 with latched values $67_{2f}$—$67_{2m}$, ..., $67_{(k-1)f}$—$67_{(k-m)m}$ (k is a board number). As a result of the comparison, when a non-coincidence is detected, reset signals $71_1$—$71_M$ are outputted to boards 12 which have non-coincident numbers between latched and counted values.

Also, in the above non-coincidence case, the counted values $67_1$—$67_M$ are reset at the time of receiving the trigger signal 62. In addition, FIFO buffer memories having the non-coincidence numbers are reset by a reset signal (not shown).

FIG. 7 is a timing chart showing an operation of the third embodiment. In FIG. 7, a period of 'supervision is given by a period of the trigger signal 62 (referring to FIG. 7(A)). This trigger signal 62 is always synchronized with a head of cell signal 73 (FIG. 7(B)). In this embodiment, the period of the trigger signals is usually set to an integral number of times for a length of the cells. In FIG. 6, the counter values $67_1$—$67_M$ indicate the number of cells stored in the FIFO buffer memories $64_1$—$64_M$ which are managed corresponding to each of output ports. These values are renewed in response to input or output of cells with synchronization by the head of cell signals 73 (FIG. 7(C)). The counter values 74 indicate the number of each of stored cells which are latched at the time of receiving the trigger signal 62 (FIG. 7 (D)).

Figure 7A:
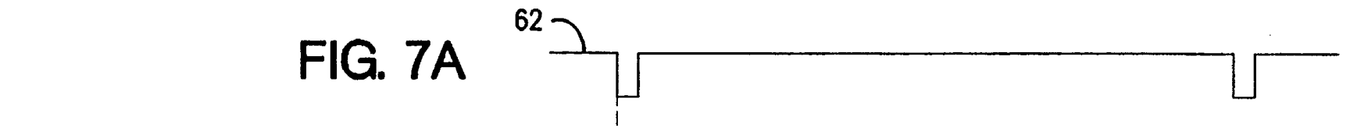
FIG. 7 is a timing chart explaining the operation of the second embodiment of the present invention.
Figure 7B:
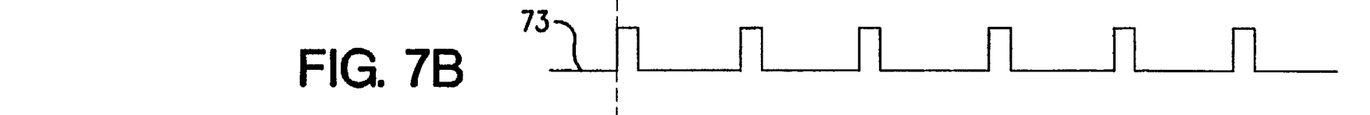
Figure 7C:
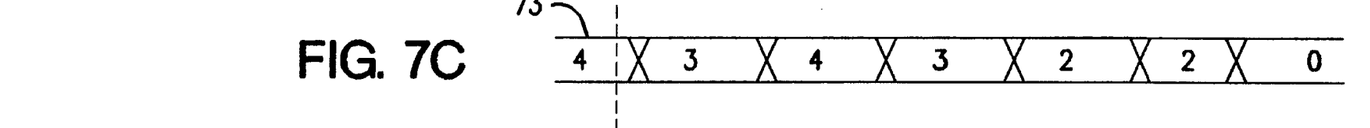
Figure 7D:
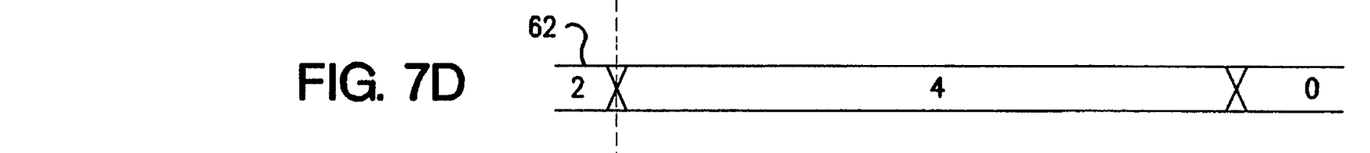
Figure 7E:
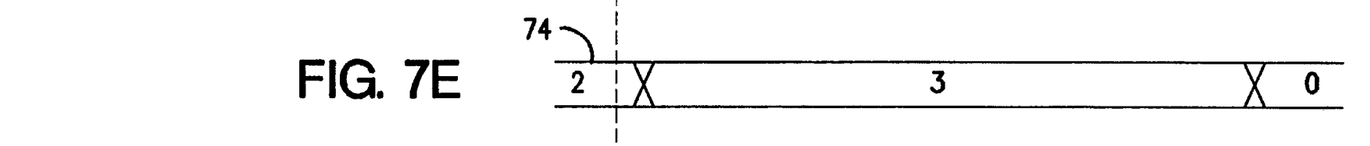
Figure 7F:
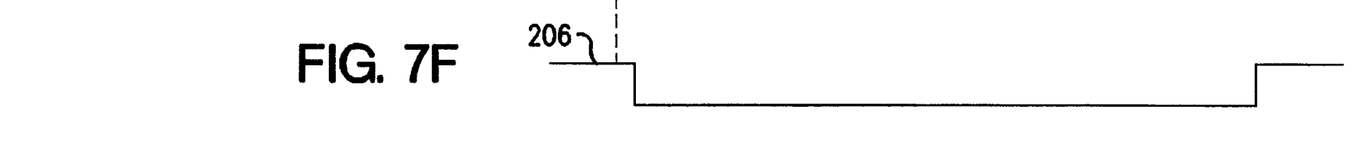

Each of the number of the stored cells sent from each slave boards is compared with the number indicated in the counter input value 74 (FIG. 7(E)) of master board, respectively. When non-coincidence is given, reset signals 75 are outputted. A reset input signal is given by a logical sum of the reset signal 751 and the others of reset signals $75_2$—$75_K$ sent from the other boards (not shown). Active situations of the reset input signal indicates that any of boards include incorrect numbers of stored cells. In FIGS. 7 (F), a low in reset signals 75 shows this situation. Then, the counted values of the stored cells 672J—67KJ in the FIFO buffer memories 641J —67KJ are reset at the time of receiving the supervising trigger signal 62.

Especially, the configuration of the third embodiment makes it easy to discriminate a board which has a non-coincident number of the stored cells from numbers of others. Therefore, it becomes possible to more effectively pick up the malfunctioning boards from the outside, by sending the information about discriminated boards. This information about error boards is immediately given without longer time than the interval of the supervising trigger signals.

Moreover, according to the present invention, the detecting of error boards and the synchronizing of these boards can be carried out at a constant processing speed, being independent of both switch size and switching speed. Therefore, the output buffer type ATM switch of the present invention is suitable to ultra high speed ATM switches.

While this invention has been described in connection with certain preferred embodiments, it is to be understood that the subject matter encompassed by way of this invention is not to be limited to those specific embodiments. On the contrary, it is intended for the subject matter of the invention to include all alternative, modification and equivalents as can be included within the spirit and scope of the following claims.

I claim:

1. An output buffer type asynchronous transfer mode (ATM) switch, comprising:

a plurality of boards having a bit slice structure, each of the boards including:

N input ports, wherein N is an integer of at least 2, supplied with N input signals, said N input signals being composed of cells prescribed by an ATM communication and divided to be input to said N input ports of each of said boards, respectively;

a cell demultiplexing circuit for demultiplexing said N input signals, dividing said demultiplexed signal into M input signals (M is integer not less than 2) in accordance with cell destinations, and outputting cell demultiplexed signals;

M output buffer circuits for temporarily storing said cell demultiplexed signals, said M output buffer circuits being controlled by an externally supplied output control signal; and M output ports, each of which outputs said cell demultiplexed signals outputted from said M output buffer circuits;

said ATM switch further comprising:

a master buffer control circuit on one of said boards, said master buffer control circuit being supplied with N control signals corresponding to said N input signals, sending said output control signal prescribed by said N control signals to each of said M output buffer circuits, and outputting a synchronizing timing signal to output said output control signal; and at least one slave buffer control circuit on another of said boards, for being supplied with N control signals corresponding to said N input signals, for receiving said timing signal from said master buffer control circuit, and for sending said output control signal prescribed by said N control signal corresponding to each of said M output buffer circuits.

2. The output buffer type ATM switch as claimed in claim 1, wherein said output buffers are of a First-in, First-out memory type.

3. The output buffer type ATM switch as claimed in claim 1, wherein said master buffer control circuit further includes timing detecting means for detecting a timing when cells input to all of said input ports are empty; and reset memory means for resetting empty output buffers when any one of said output buffers corresponding to said output ports is empty at said timing detected by said timing detecting means, to synchronize all of said boards.

4. The output buffer type ATM switch as claimed in claim 1, wherein said master buffer control circuit further includes output port detecting means for detecting output ports to which cells input to all of input ports are not addressed, and reset means for resetting corresponding empty output buffers to synchronize all of boards if any one of said output buffers corresponding to said output ports is empty at the time when said output port detecting means detects said output ports to which cells input to all of the input ports are not addressed.

5. The output buffer type ATM switch as claimed in claim 3, said output buffer type ATM switch further comprising:

receiving means for receiving routing control signals, input to said buffer control circuits synchronizing with input timing of each of the cells, said routing control signals having discriminating information for indicating whether each of the cells is empty or not, and said buffer control circuits further including cell judging means for judging-whether each of the cells corresponding to each of said N input ports is empty using said routing control signals and reset means for resetting said each of output buffer circuits when each of said N input ports is empty.

6. The output buffer type ATM switch as claimed in claim 3, said output buffer type ATM switch further comprising:

an auxiliary master board and at least one auxiliary slave board; and exchanging means for exchanging said master board and said slave boards for said auxiliary master board and said auxiliary slave boards, respectively at the timing when said reset means resets.

7. The output buffer type ATM switch as claimed in claim 4, wherein said reset means includes lapse time measuring means for measuring a lapse of time from a resetting operation to synchronize among all of the boards to a subsequent setting operation, monitoring cell supply means for supplying monitoring cells to said boards at the time when a value measured by said lapse time measuring means exceeds a predetermined threshold value, diagnosing means for diagnosing, using said monitoring cells, whether errors occur during the asynchronous transmitting, and force-operation means for forcing said reset means to operate when said diagnosing means diagnoses an occurrence of errors.

8. The output buffer type ATM switch as claimed in claim 4, wherein said reset means includes lapse time measuring means for measuring a lapse of time from a resetting operation to synchronize among all of the boards to a subsequent setting operation, monitoring cell supply means for supplying monitoring cells to said boards at the time when a value measured by said lapse time measuring means exceeds a predetermined threshold value, diagnosing means for diagnosing, using said monitoring cells, whether errors occur during the asynchronous transmitting, and force operation means for forcing said reset means to operate when said diagnosing means diagnoses an occurrence of errors.

9. The output buffer type ATM switch as claimed in claim 1, said ATM switch further comprising:

trigger generating means for periodically generating trigger signals at predetermined intervals and for sending said trigger signals to said master buffer control circuit stored cell number detecting means, provided in each of said output buffers, for detecting a number of the cells stored in each of said output buffers connected to said master buffer control circuits upon receipt of said trigger signals and for informing said number of the cells to said master buffer control circuit; and master stored cell number detecting means, provided in said master buffer control circuits, for detecting the number of the master stored cells stored in each of said output buffers connected to said master buffer control circuits upon receipt of said trigger signals;

comparing means for receiving said number of the cells stored in said output buffers and the number of the master stored cells stored in said output buffers and for comparing them for each of said output buffers; and reset signal generating means for transmitting a reset signal, to reset each of said output buffers, to said buffer control circuits, when both numbers do not agree.

10. The output buffer type ATM switch as claimed in claim 9, wherein said output buffer type ATM switch further comprises:

an alarm circuit which generates an alarm to discriminate which of the boards which comprises said stored cell number which-does not agree with any of said master stored cell number and another stored cell number.

11. The output buffer type ATM switch as claimed in claim 10, wherein said output buffer type ATM switch further comprises:

an alarm circuit which generates an alarm to discriminate which of the boards connected to said master buffer control circuits comprises said stored cell number which does not agree with said master stored cell number.

12. The output buffer type ATM switch as claimed in claim 9, wherein said predetermined interval is longer than a length of said cells.

13. The output buffer type ATM switch as claimed in claim 12, wherein said predetermined interval is set to an integral number having times for the length of said cells.

14. A method for detecting error-containing boards in an output buffer type ATM switch, said output buffer type ATM switch comprising a plurality of boards having a bit slice structure having N input ports and M output-ports, N and M each being integers not less than 2, master buffer circuits provided for each of said M output ports, at least a slave buffer circuit provided with each of said M output ports, a master buffer control circuit on one of said boards, and at least one slave buffer control circuit on another of said boards, said method comprising the steps of:

supplying said N input ports with N input signals composed of cells prescribed by an ATM communication, bit-slicing said N input signals into each of N input ports of each said boards, respectively;

demultiplexing said bit-sliced N input signals into M input signals in accordance with cells destinations;

temporarily storing each of said cell demultiplexed signals in each of said master buffer circuit and said slave buffer circuit, respectively;

outputting a synchronizing timing signal to output said output control signal from said master buffer control circuit to each of said slave buffer control circuit;

sending an output control signal prescribed by said N input signals to each of M output ports to each of said master boards and to said slave boards upon receiving said timing signal from said slave buffer control circuit; and outputting said cell demultiplexed signals from said M output buffer circuits to said M output ports by said output control signals., respectively.

15. The method for detecting error-containing boards for an output buffer type ATM switch as claimed in claim 14, wherein said storing step, performed by first-in first-out (FIFO) buffer memories, further comprises the steps of:

writing said cell demultiplexed signals into said FIFO buffer memories; and reading said cell demultiplexed signals from said FIFO buffer memories.

16. The method for detecting error-containing boards for an output buffer type ATM switch as claimed in claim 14, wherein said timing signal outputting step further comprises the steps of:

detecting a timing when cells inputted into all of said input ports are empty; and resetting empty output buffers to synchronize all of said boards when any one of said output buffers corresponding to said output ports is empty at said detected timing.

17. The method for detecting error-containing boards for an output buffer type ATM switch as claimed in claim 14, wherein said timing signal outputting step further comprises the steps of:

detecting output ports to which cells inputted to all of input ports are not addressed; and resetting corresponding empty output buffers to synchronize among all of said boards when any one of said output buffers corresponding to said output ports is empty at the time when said output port to which cells inputted into all of the input ports are not addressed are detected.

18. The method for detecting error-containing boards for an output buffer type ATM switch as claimed in claim 16, wherein said demultiplexed cells outputting step further comprises the steps of:

discriminating whether each of the cells is in an empty state, by routing control signals indicating said state input to said buffer control signals;

judging whether each of the cells corresponding to each of N input ports is empty; and resetting output ports in which all of said cells are empty.

19. The method for detecting error-containing boards for an output buffer type ATM switch as claimed in claim 16, said output buffer type ATM switch further comprising an auxiliary master board and at least one auxiliary slave board, wherein said resetting step further comprises a step of exchanging a currently used master board and slave boards for said auxiliary master board and said auxiliary slave boards, respectively, at the timing when said resetting is performed.

20. The method for detecting error-containing boards for an output buffer type ATM switch as claimed in claim 17, said output buffer type ATM switch further comprising an auxiliary master board and at least one auxiliary slave board, wherein said resetting step further comprises a step of exchanging a currently used master board and currently used slave boards for said auxiliary master board and said auxiliary slave boards, respectively, at the timing when said resetting is performed.

21. The method for detecting error-containing boards for an output buffer type ATM switch as claimed in claim 16, wherein said resetting step comprises the steps of:

measuring a lapse of time from resetting operation to synchronize all of the boards to a subsequent setting operation, supplying monitoring cells to said boards at the time when a value measured by said lapse of time measuring means exceeds a predetermined threshold value, diagnosing said monitoring cells to determine whether troubles occur during the asynchronous transmitting, and resetting said output ports in which said troubles occur.

22. The method for detecting error-containing boards for an output buffer type ATM switch as claimed in claim 17, wherein said resetting step further comprises the steps of:

measuring a lapse of time from resetting operation to synchronize all of the boards to a subsequent setting operation, supplying monitoring cells to said boards at the time when a value measured by said lapse time measuring means exceeds a predetermined threshold value, diagnosing said monitoring cells to determine whether troubles occur during the asynchronous transmitting, and resetting said output ports in which said troubles occur.

23. The method for detecting error-containing boards for an output buffer type ATM switch as claimed in claim 14, said method further comprising the steps of:

generating trigger signals;

sending said trigger signals to said master buffer control circuits detecting the number of the master stored cells stored in each of said output buffers connected to said master buffer control circuits when said trigger signals is received;

receiving said number of the cells stored in said output buffers and the number of the master stored cells stored said output buffers;

comparing said number of the cells stored in said output buffers and the numbers of master stored cells stored said output buffers; and resetting each of said output buffers to buffer control circuits, when both numbers do not agreed.

24. The method for detecting error-containing boards for an output buffer type ATM switch as claimed in claim 23, wherein said method further comprises the steps of:

comparing said number of the cells stored in said output buffers and the numbers of master stored cells stored said output buffers; and transmitting an alarm which discriminates a number of the boards and which indicates a stored cell number to the outside, when said stored cell number which does not agreed with any of said master stored cell number and another stored cell number is present.

25. The method for detecting error-containing boards for an output buffer type ATM switch as claimed in claim 23, wherein said method further comprises the steps of:

comparing said number of the cells stored in said output buffers and the numbers of master stored cells stored said output buffers; and generating an alarm to discriminate which of said numbers of the boards connected to said master buffer control circuits comprises a stored cell number which does not agree with said master stored cell number.

* * * * *